United States Patent [19]

Joutel

[11] Patent Number: 4,980,091
[45] Date of Patent: Dec. 25, 1990

[54] METHOD AND DEVICE ENABLING MOLTEN RADIOACTIVE GLASS TO BE CAST INTO A CONTAINER

[75] Inventor: Serge Joutel, Maisons-Laffitte, France

[73] Assignee: Compagnie Generale des Matieres Nucleaires, Velizy-Villacoublay, France

[21] Appl. No.: 198,574

[22] Filed: May 25, 1988

[30] Foreign Application Priority Data

May 27, 1987 [FR] France ................... 87 07497

[51] Int. Cl.⁵ .................................. G21F 9/16
[52] U.S. Cl. ...................... 252/629; 65/32.5; 65/34; 65/122; 65/124; 65/130; 65/329; 252/633; 376/272
[58] Field of Search ............ 252/629, 633; 376/272; 53/268, 467; 65/124, 32.5, 34; 141/113, 374

[56] References Cited

U.S. PATENT DOCUMENTS

| 1,789,480 | 1/1931 | Soubier | 65/32 |
| 3,658,179 | 4/1972 | Baumann et al. | 210/452 |
| 4,341,547 | 7/1982 | Heimerl | 65/124 |
| 4,490,287 | 12/1984 | Hardwick et al. | 252/629 |
| 4,582,674 | 4/1986 | Stritzke | 376/272 |
| 4,643,869 | 2/1987 | Heimerl et al. | 376/272 |
| 4,666,494 | 5/1987 | Stritzke et al. | 65/32 |
| 4,690,781 | 9/1987 | Heimerl et al. | 252/633 |

FOREIGN PATENT DOCUMENTS 1215265 12/1970 United Kingdom .

Primary Examiner—Howard J. Locker
Attorney, Agent, or Firm—Mason, Fenwick & Lawrence

[57] ABSTRACT

A method and device for enabling a molten radioactive glass to be cast from a crucible (2) situated in a top cell (1) and a container (4) situated beneath said crucible in a bottom cell (3), the radioactive glass flowing vertically downwards along a casting axis through an opening provided in a concrete slab (5) which separates said cells, said device being characterized in that it comprises the following components in succession going downwardly: a deformable guide tube (11) constituted by two housings (14, 15) slidably mounted in each other, with the inner walls (20, 21) thereof being frustoconical in shape, and the apex of said frusto-conical shape being situated beneath said guide tube, the top housing (14) being fixed beneath said concrete slab, the bottom housing (15) having an end wall (22) in the form of a portion of a sphere, and said two housings being interconnected by a metal bellows (23); and a moving tube (12) constituted by an enclosure (32) whose inside wall extends downwardly so as to be capable of penetrating into the neck of the container (4), whose top face (34) is in the form of a frusto-conical surface suitable for co-operating with the spherically-shaped end wall (22) of the bottom housing (15), with the inner wall of the enclosure being pierced by holes (38), and with the outer wall of the enclosure including a pipe (37) connected to a suction system.

10 Claims, 3 Drawing Sheets

METHOD AND DEVICE ENABLING MOLTEN RADIOACTIVE GLASS TO BE CAST INTO A CONTAINER

The present invention relates to a device enabling molten radioactive glass to be cast into a container.

BACKGROUND OF THE INVENTION

Nuclear fuel is reprocessed in order to separate the uranium, the plutonium, and the fission products present in fuel elements that have spent time in a reactor.

A method known as "vitrification" has been developed to include a certain number of radioactive elements (and in particular fission products) within a vitreous matrix.

Glass frit and calcinates of fission products are simultaneously melted in the crucible of an induction oven in order to obtain a glass. This glass is then cast into stainless steel containers.

This method is imposed since it enables highly active products to be stored over long periods of time with very high security.

This entire method of operation has been widely used, described, and demonstrated, in particular at the Marcoule Nuclear Center (vitrification workshops).

In general, the installation comprises two levels which are separated by a slab. The upper level contains the crucible in an oven, and the lower level contains the container which is disposed vertically below a casting hole from the crucible. An opening through the slab allows casting to take place.

The following problems arise:
  the molten glass must be strictly confined so that there is no dissemination of radioactivity, particularly while casting;
  all of the gases, dust, and particles that may be given off must be collected; and
  the container must be allowed to expand under the effect of increasing temperature (increasing between the empty container and the container full of very hot glass).

The first problem further includes avoiding any contamination on the outside of the container.

SUMMARY OF THE INVENTION

The present invention principally describes a device making it possible to cast glass into a container while simultaneously solving the above three problems; said problems are solved by providing a device which includes static (material) sealing between the various components of the device and, when such static sealing is not possible, it includes dynamic confinement by means of a flow of air (or gas) around the molten glass while it is being cast.

Another characteristic of the invention is that by virtue of said dynamic confinement, there is no contact between the top of the container and the casting hole.

BRIEF DESCRIPTION OF THE DRAWINGS

An embodiment of the invention is described by way of example with reference to the accompanying drawings, in which:

FIG. 2 is a vertical section through the deformable guide tube showing it in its extended position, whereas

FIG. 3 is a vertical section through the deformable guide tube in its retracted position;

MORE DETAILED DESCRIPTION

Figure 1:
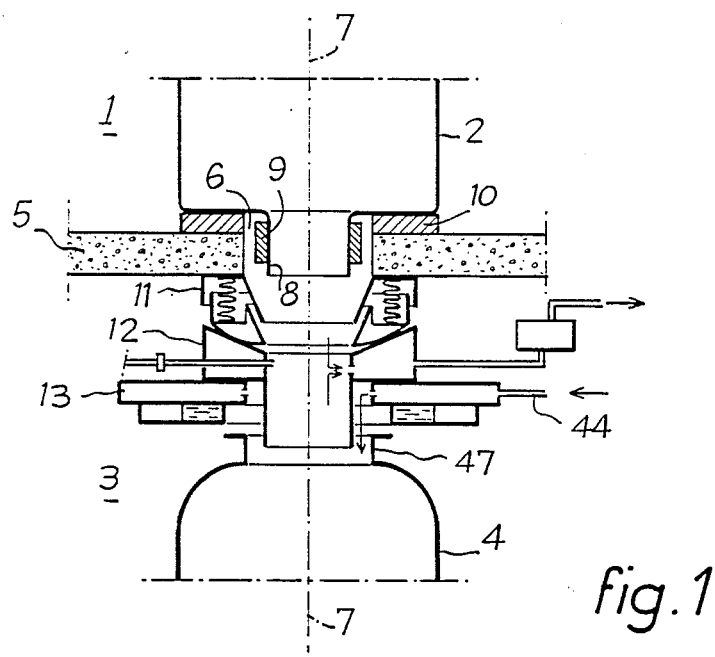
FIG. 1 is a vertical section on the casting axis of the device as a whole.

The device in accordance with the inventions serves to transfer molten glass between two superposed cells which are separated by a slab of concrete. The top or melting cell 1 contains the crucible 2; the bottom or casting cell 3 contains the container 4 into which the molten radioactive glass from said crucible is to be cast from one cell to the other through a horizontal concrete slab 5 having an opening 6. The crucible 2, the opening 6, and the container 4 are organized about a vertical axis 7 referred to as the "casting" axis.

The radioactive glass is in the liquid state in the crucible 2 and it is held in said crucible by a plug of solid glass which closes the mouth 8 of said crucible. An inductor 9 is placed around said mouth and serves, at the selected moment, to soften the plug-forming solid glass so as to allow the molten glass contained in the crucible to flow out through said mouth. The inductor 9 is connected via connections (not shown) to a source of suitable energy (e.g. electrical energy) enabling said inductor and the solid glass to be heated.

An insulating mat 10 insulates the crucible 2 from the concrete slab 5.

The device in accordance with the invention is disposed beneath the concrete slab around the opening 6 therethrough, and it is constituted by the following items in succession in a downwards direction:
  a deformable guide tube 11;
  a moving tube 12; and
  a moving dome 13.

These various components of the device in accordance with the invention are described in greater detail below.

Figure 2:
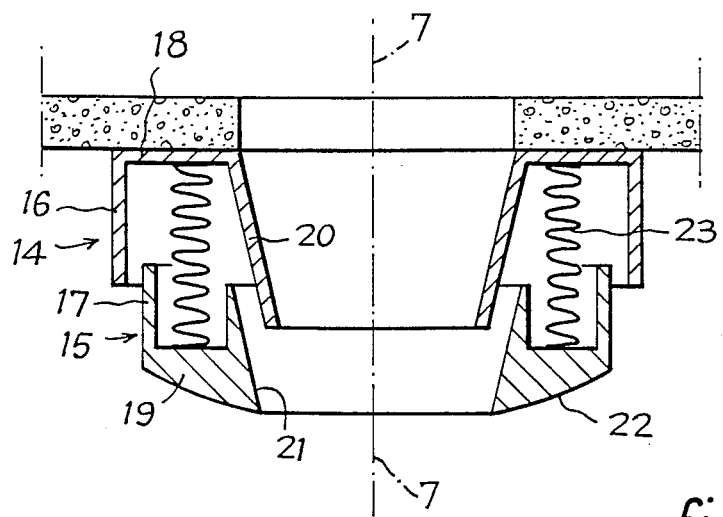
Figure 3:
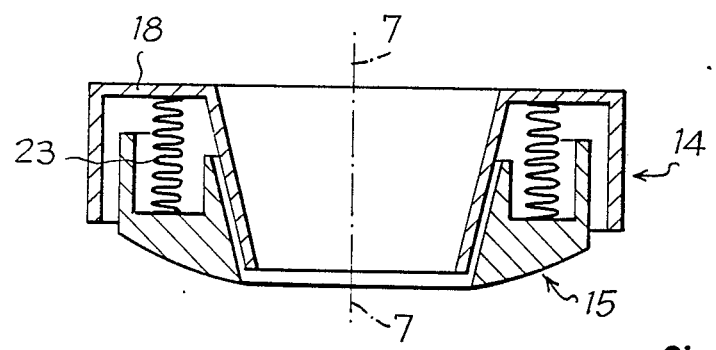
FIG. 3 shows it in its clamped position.

The deformable guide tube is shown, more particularly, in FIGS. 2 and 3.

This deformable guide tube is constituted by two interpenetrating housings slidable in each other, with the bottom housing entering into the top housing.

Both the top housing 14 and the bottom housing 15 are constituted by an inner wall 20, 21, by an end wall 18, 19, and by an outer wall 16, 17 which may be in the form of a vertical axis cylinder, for example.

The inner walls 20 and 21 are frusto-conical in shape, with both housings preferably having the same angle at the apex, and with the apex being situated beneath said deformable guide tube.

Both housings are open: the top housing has its opening facing downwards, and the bottom housing has its opening facing upwards.

As mentioned above, the sizes and dispositions of said housings are such as to enable them to inter-penetrate each other.

The end wall 18 of the top housing is fixed underneath the concrete slab.

The end wall 19 of the bottom housing has its (bottom) outside face 22 in the form of a portion of a sphere.

The two housings are interconnected by a metal bellows 23 which is welded to the facing end walls of said housings.

Figure 4:
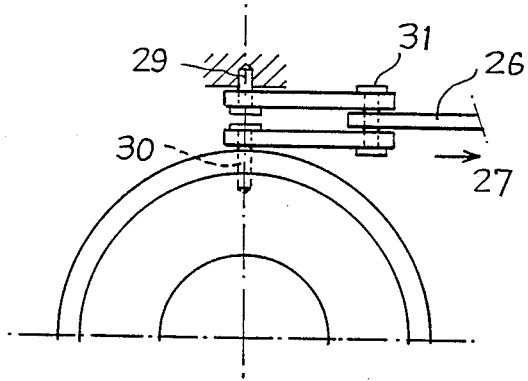
FIG. 4 is a half-view of the bottom of the deformable guide tube.
Figure 5:
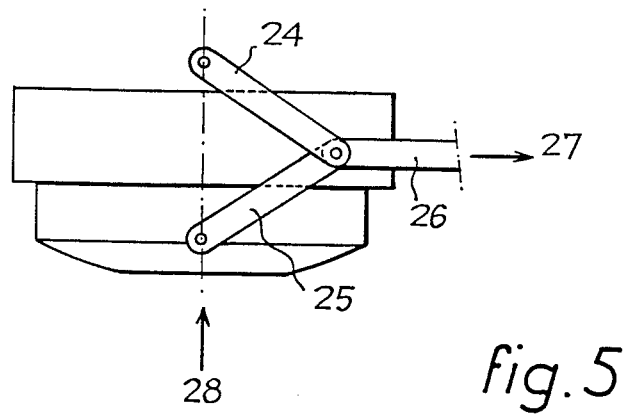
FIG. 5 is a corresponding side view of the deformable guide tube (with FIGS. 4 and 5 showing the linkage)

A linkage comprising rods 24, 25, and 26 (see FIGS. 4 and 5) serves to move the housings towards each other. By pulling on rod 26 (arrow 27), rods 24 and 25 are moved towards each other, thereby reducing the height (arrow 28) of the deformable guide tube along the axis 7—7, and simultaneously compressing the metal bellows. Rod 24 is fixed by an anchor screw 29. Rod 25 is fixed to the outer cylindrical wall of the bottom housing about a pin 30. All three rods are interconnected by a pin 31.

Only one linkage is shown, but it is necessary to make use of at least two linkages in order to prevent the two portions of the guide tube tilting relative to each other. It is preferable to use four linkages. The two cylindrical vertical outer walls of the housings move relative to each other without coming into contact and they protect the bellows against risks of external shocks.

Figure 6:
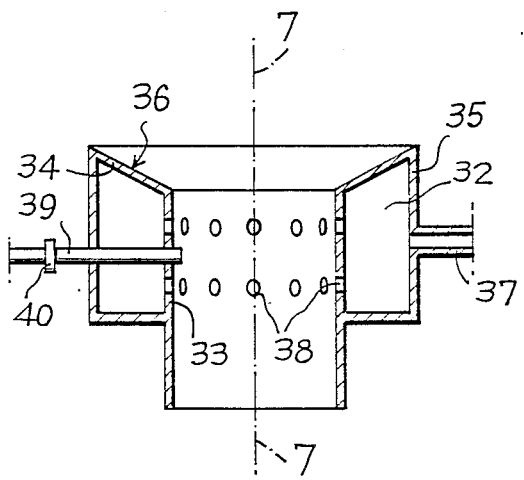
FIG. 6 is a vertical section through the moving tube.

The moving tube is shown in FIG. 6.

This moving tube is constituted by an enclosure 32 which is essentially constituted by an outer wall 35, a top wall 34, and an inner wall 33 which is cylindrical in shape, with the diameter of said cylinder being preferably the same as the smallest diameter of the truncated cones which constitute the inner walls of the housings 14 and 15. The inner wall 33 of the enclosure extends downwardly so as to be capable of penetrating into the neck of the container 4. The outer face 36 of the top wall 34 of the enclosure 32 is in the form of a frusto-conical surface which is circularly symmetrical about the casting axis so that by co-operating with the bottom spherical face 22 of the housing 15 it provides sealing between said housing 15 and said moving tube 12.

The outside wall 35 of the enclosure 32 bears a pipe 37 which is connected via a filter to a suction system (not shown). This filter-and-suction system serves to reduce the pressure inside the enclosure 32.

The inner wall 33 of the enclosure 32 includes a plurality of holes 38. Under the effect of said suction system, these holes serve to set up a flow of air (or gas) from the volume situated inside the wall 33 and the inside of the enclosure 32.

An inspection tube 39 is advantageously provided passing through the outer face 35 and the inner face 33 of the enclosure 32 to make it possible to observe the glass being cast by means of a suitable and conventional optical device. The inspection tube 39 may be closed by means of a glass plate 40, which plate is transparent and is preferably made of cerium glass which is suitable for withstanding the radiation emitted by the radioactive glass.

Figure 7:
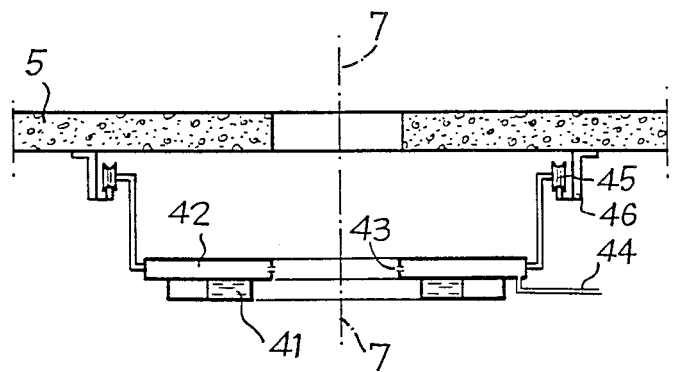
FIG. 7 is a vertical section showing the system for displacing the moving dome.

This moving tube is advantageously put into place and held in place by using a moving dome 13 as shown in FIG. 7.

This moving dome is essentially constituted by two superposed annular chambers 41 and 42.

The annular chamber 41 is intended to receive a flow of water for the purpose of cooling said dome.

The annular chamber 42 has openings 43 in its front face (i.e. its face which is closest to the casting axis). It also includes a pipe 44 enabling air to be injected into said chamber.

The moving dome may be displaced for the purpose of putting it into place or removing it by means of a device including wheels 45 running on rails 46 which are fixed beneath the concrete slab 5.

The installation of the various components of the device in accordance with the invention and the operation of said device are described briefly below.

It is assumed that the entire top portion of the device, namely the crucible 2, the insulating mat 10, and the inductor 9 is in place, and that the deformable guide tube 11 has been fixed beneath the concrete slab 5.

By acting on the linkage described (24, 25, 26, 27) said deformable guide tube is put into a minimum height position (FIG. 3). Then, the moving dome 13 carrying the moving tube 12 is brought into place beneath the deformable guide tube 11, and by acting on said linkage, the deformable guide tube is put into its maximum height position, i.e. the bottom outer face 22 of said guide tube is brought into sealed contact with the top face 36 of the moving tube.

The container 4 is then moved into place on a carriage and is positioned by means of a lifting device on the carriage. When in position, the neck 47 of said container surrounds the downwardly extending cylinder constituted by the inside wall of the enclosure 32.

It may be observed, that by virtue of the insulating mat and by virtue of the dispositions used for the deformable guide tube and for the moving tube, complete sealing is provided between the crucible and the bottom of the moving tube.

Further, by virtue of the suction system connected to the enclosure 32 and to the air inlet pipe 44 connected to the chamber 42 in the moving dome, a flow of air (or gas) is set up in the volume situated inside the wall 33.

I claim:

1. A device for enabling a molten radioactive glass to be cast from a crucible situated above the device into a container having a neck situated below the device, the device comprising:

a deformable guide tube comprising a top housing and a bottom housing slidably mounted in each other, said housings comprising frusto-conical innerwalls with an apex beneath said guide tubes said bottom housing including an end wall; and a moving tube comprising an enclosure having an inside wall extending downwardly to penetrate said neck of the container, said moving tube further comprising a top face shaped in the form of a frusto-conical surface for co-operating with said end wall of said bottom housing;

wherein said deformable guide tube is situated below the crucible and above said moving tube, and said moving tube is in turn situated above the container, so that the radioactive glass flows vertically downward from the crucible though said deformable guide tube and said moving tube to the container by the action of gravity.

2. The device according to claim 1, wherein:

said moving tube is carried by a moving dome, and said moving dome comprises two superposed annular chambers, with one of said chambers for receiving cooling water, and the other of said chambers provided with holes in its front face and a pipe for supplying air.

3. The device according to claim 2, wherein:

said enclosure of said moving tube comprises an inspection tube for viewing the glass inside said moving tube.

4. The device according to claim 1, wherein:

said enclosure of said moving tube comprises an inspection tube for viewing the glass inside said moving tube.

5. A device for enabling a molten radioactive glass to be cast, comprising:
- a top cell having a crucible therein for providing the molten radioactive glass which is to be cast;
- a bottom cell having a container therein for receiving the radioactive glass to be cast, said container being disposed beneath said crucible and having a neck;
- a concrete slab separating said bottom cell from said top cell;
- a deformable guide tube comprising top and bottom housings slidably mounted in each other and a metal bellows interconnecting said top and bottom housings, said housings comprising frusto-conical inner walls with an apex beneath said guide tube, and said top housing being fixed beneath said concrete slab, said bottom housing including an end wall which comprises a portion of a sphere; and
- a moving tube comprising an enclosure including an outer wall, and an inner wall extending downwardly to penetrate said neck of said container, said moving tube comprising a top face in the form of a frusto-conical surface for co-operating with said end wall of said bottom housing, said inner wall of said enclosure being pierced with holes and said outer wall of said enclosure including a pipe connected to a suction system;
- wherein the molten radioactive glass flows vertically downward along a casting axis through an opening in said concrete slab, through said deformable guide tube and said moving tube, and into said container so as to be cast.

6. The device according to claim 5, wherein:
- said moving tube is carried by a moving dome which comprises two superposed annular chambers, with one of said chambers for receiving cooling water, and the other of said chambers provided with holes in its front face and a pipe for supplying air.

7. The device according to claim 5, wherein:
- said enclosure of said moving tube comprises an inspection tube for viewing the glass inside said moving tube.

8. A device for enabling a molten radioactive glass to be cast, comprising:
- a top cell having a crucible therein for providing the molten radioactive glass which is to be cast;
- a bottom cell having a container therein for receiving the radioactive glass to be cast, said container disposed beneath being said crucible and having a neck;
- a concrete slab separating said bottom cell from said top cell;
- a deformable guide tube comprising top and bottom housings slidably mounted in each other and a metal bellows interconnecting, said top and bottom housings comprising frusto-conical inner walls with an apex beneath said guide tube, and said top housing being fixed beneath the concrete slab, said bottom housing including an end wall which comprises a portion of a sphere;
- a moving tube comprising an enclosure including an inner wall extending downwardly to penetrate said neck of said container, said moving tube comprising a top face in the form of a frusto-conical surface for co-operating with said end wall of said bottom housing said inner wall of said enclosure being pierced with holes and said outer wall of said enclosure including a pipe connected to a suction system;
- wherein said moving tube is carried by a moving dome which comprises two superposed annular chambers, with one of said chambers for receiving cooling water, and the other of said chambers provided with holes in its front face and a pipe for supplying air;
- wherein said enclosure of said moving tube comprises an inspection tube for viewing the glass inside said moving tube; and
- wherein the molten radioactive glass flows vertically downward along a casting axis through an opening in said concrete slab, through said deformable guide tube and said moving tube, and into said container so as to be cast.

9. A method of casting molten radioactive glass from a crucible into a container disposed beneath the crucible, said method comprising the steps of:
(1) providing a device comprising:
- (a) a deformable guide tube comprising a top housing and a bottom housing slidably mounted in each other, said housings comprising frusto-conical inner walls with an apex beneath said guide tube, said bottom housing including an end wall; and
- (b) a moving tube comprising an enclosure whose inside wall extends downwardly to penetrate an upper neck of the container, the moving tube further comprising a top face shaped in the form of a frusto-conical surface for co-operating with the end wall of the bottom housing;
- wherein the crucible is situated above the deformable guide tube, which is in turn situated above the moving tube, which is in turn situated above the container;

(2) placing the container beneath the device;
(3) allowing the molten radioactive glass to flow under the force of gravity downward from the crucible through the deformable guide tube and the moving tube into the container; and
(4) allowing the molten radioactive glass to be cast.

10. The method of casting radioactive glass according to claim 9, further comprising the steps of:
(5) replacing the container in which the molten radioactive glass has been cast with a second container; and
(6) repeating steps (3) and (4) so as to allow molten radioactive glass to be cast in the second container.

* * * * *